May 12, 1970
E. C. MUTSCHLER ET AL
3,512,177
INK RECORDING SYSTEM
Filed Dec. 26, 1968
4 Sheets-Sheet 1
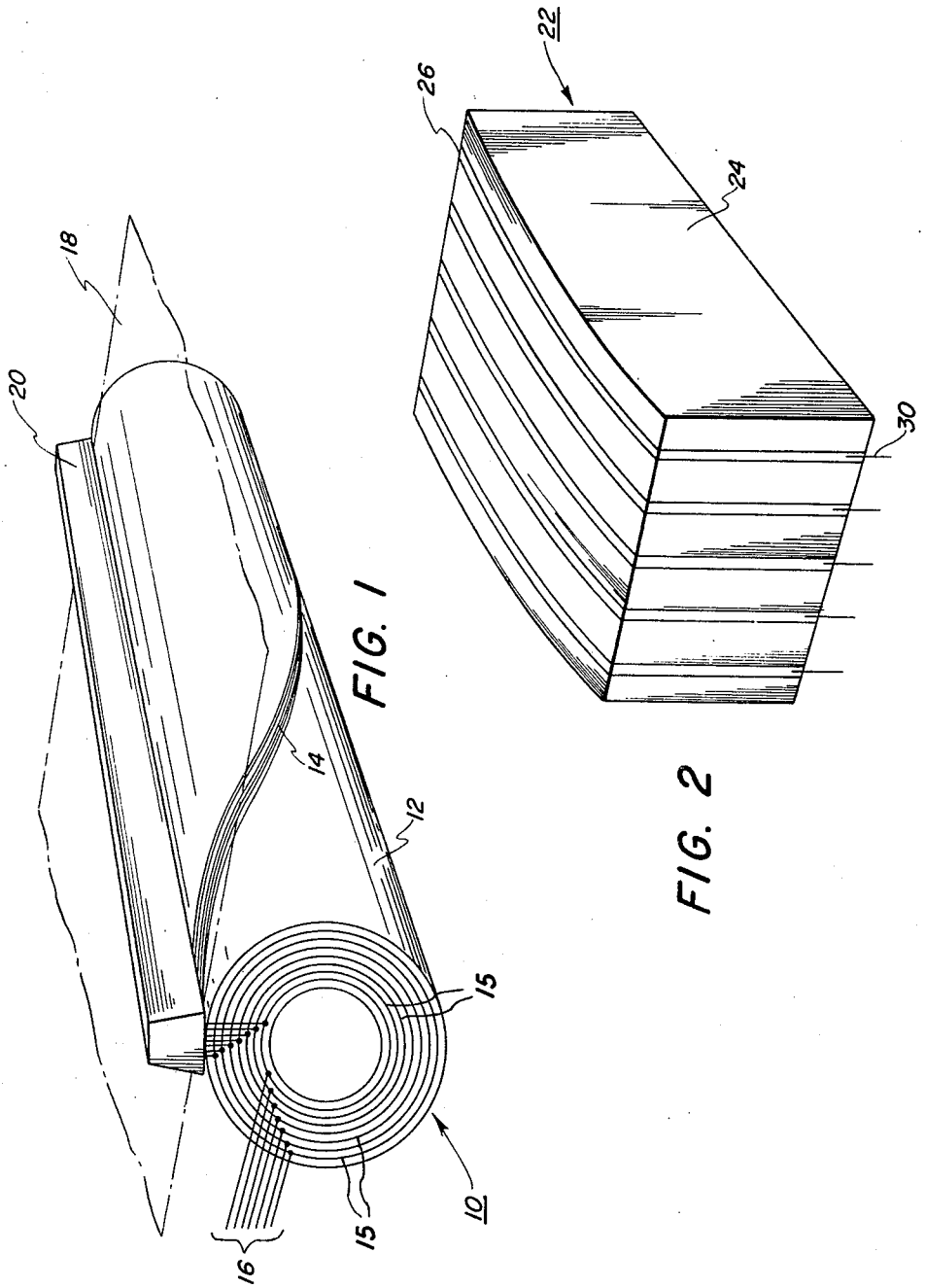
INVENTORS
EDWARD C. MUTSCHLER
ULDIS KLAVSONS
BY John E. Beck
ATTORNEY

INVENTORS
EDWARD C. MUTSCHLER
ULDIS KLAVSONS

BY John E. Beck

ATTORNEY

INVENTORS
EDWARD C. MUTSCHLER
ULDIS KLAVSONS

United States Patent Office 3,512,177
Patented May 12, 1970

---

3,512,177
INK RECORDING SYSTEM
Edward C. Mutschler, Rochester, and Uldis Klavsons, Pittsford, N.Y., assignors to Xerox Corporation, Rochester, N.Y., a corporation of New York
Filed Dec. 26, 1968, Ser. No. 786,903
Int. Cl. G01d 15/16
U.S. Cl. 346—140
6 Claims

ABSTRACT OF THE DISCLOSURE

A recording system wherein a linear ink source is provided coextensive with one dimension of a recording medium which is moved therepast. On the side of the recording medium opposite this linear ink source, active ink attracting electrodes are selectively presented thereby effecting the deposition of ink onto the recording medium from the ink source. The type of backing assembly embodying these active electrodes is such as to enable high speed elemental line recording.

---

This invention relates generally to recording apparatus, and, more specifically, to recording apparatus utilizing liquid ink as a marking medium.

The advantages of liquid ink recorders are generally well known. The ability to use low cost recording media render these recorders very attractive to cost conscious users. In addition, the instantaneous display of the visible ink depositions widen the range of applications to which these devices are adaptable.

However, since most liquid ink recorders are basically mechanical in nature, certain limitations on speed of recording arise which only detract from the desirability of such devices for preesnt day higher speed applications.

One type of prior art ink recorder employs a retractable ink-fed stylus which deposits ink only during contact with the recording medium. This contact is controlled by electrical information signals and is incapable of high speed operation.

Continuous contact recorders wherein ink is deposited only during relative movement between the stylus and the recording medium are limited in applicability to situations where oscillographic traces are to be recorded.

Other recorders utilize a plurality of capillary-fed stylus to supply ink near to the recording surface. Flow to the recording surface is effected by electrical signals applied between a particular stylus or group of styli and a conductive backing electrode which lies in the entire recording zone behind the recording medium. This usually results in a capacitive buildup of charges on the styli which causes erratic operation.

Ink recorders as described in U.S. Pats. 3,289,211 and 3,375,528, assigned to the same assignee as the instant application, eliminate many of the speed limiting factors. However, these recorders employ a recording head which deposits ink in unitary, integral amounts and must be moved physically across the recording medium in order to record an entire line of information. This operation makes high speed recording difficult.

Therefore, it is an object of the present invention to improve high speed liquid ink recording.

Also, it is an object of the present invention to provide an improved ink recorder wherein physical motion of the ink source is obviated.

These objects and other objects which may become apparent are accomplished in accordance with the principles of the present invention wherein a linear ink source is provided coextensive with one dimension of a recording medium which is moved therepast. On the side of the recording medium opposite this linear ink source, active ink attracting electrodes are selectively presented thereby effecting the deposition of ink onto the recording medium from the ink source. The type of backing assembly embodying these active electrodes in such as to enable high speed elemental line recording.

These and other advantages and objects of the present invention may become more apparent from the following detailed description when read in connection with the accompanying drawings wherein:

FIG. 1 represents recording apparatus utilizing one embodiment of the backing assembly in accordance with the present invention;

FIG. 2 represents another embodiment of the backing assembly;

Figure 3:
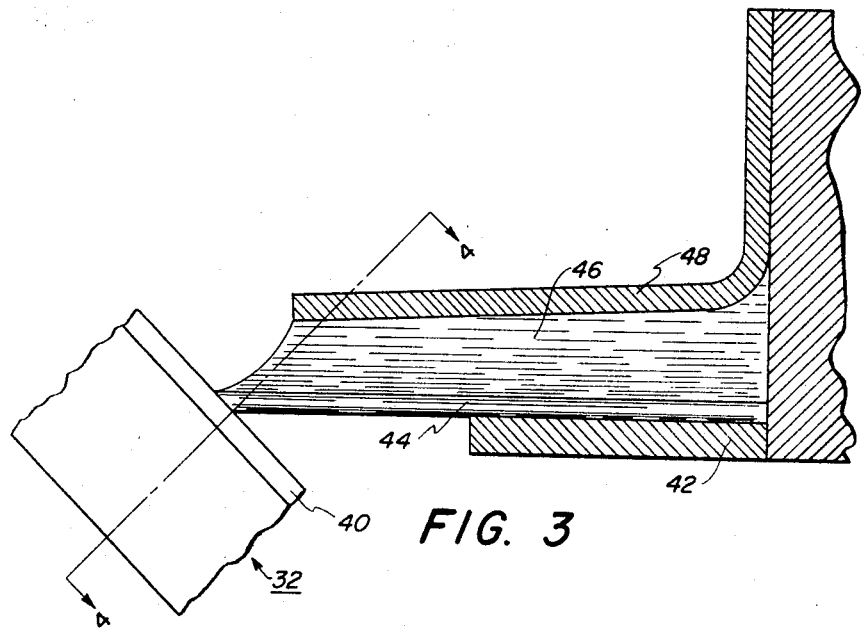
FIG. 3 shows a cross-sectional view of one embodiment of the linear ink source of the present invention.

Before a detailed description of the features of the present invention are presented, the broad phenomenon believed to be utilized in effecting ink deposition on a recording medium will be described.

A linear ink source is utilized to provide a substantially linear locus of ink menisci which are maintained at a position slightly spaced from the recordng surface of a recording medium. This ink source is generally conductive and is provided with an electrical signal of predetermined voltage level and polarity as will become apparent hereinafter.

A suitable reservoir of ink is made available to the linear ink source to reestablish a particular meniscus which is broken during operation of the apparatus.

On the side of the recording medium opposite the linear ink source, there is provided a backing assembly which comprises an electrically conductive member. Information to be recorded is provided in the form of intelligence signals which are applied to this conductive member. The magnitude and polarity of this intelligence signal depends upon the characteristics of the signal applied to the linear ink source.

During the absence of any intelligence signals applied to the conductive backing assembly, the ink will be maintained in a static condition in the linear ink source by capillary action. When a signal is applied to the backing assembly, the ink will flow breaking the meniscus at one point, for example, along the locus represented by the linear ink source. This flow of ink will continue for substantially the duration of the application of the intelligence signal to the backing electrode. It may be theorized that the principle moving force influencing the ink flow is coulomb attraction.

The type of ink is not critical and various commercial ink preparations have been used successfully. The viscosity of the ink is also not critical and will vary as a function of the type of linear ink source utilized as will be described.

The recording medium may be a sheet of paper, plastic, or other material preferably having a resistivity of one thousand ohms per centimeter or greater. This range of resistivity is necessary to prevent excessive current flow through the recording medium. Such an excessive current flow would unduly load the signal source which is undesirable.

The signal source may provide a signal voltage which is

A.C. or D.C. and may have a range of 800 to 1500 volts. The upper limit in the voltage range of the applied intelligence signal is limited by the cost of electrical components and the choice of recording media available. As an example, the threshold for ink deposition using three mil common paper as the recording medium is approximately 200 volts. This varies with conductivity and thickness of the recording medium.

Reference will now be made to FIGS. 1 and 2 which illustrate two embodiments of the conductive backing assembly previously alluded to. In FIG. 1, the conductive backing assembly 10 represented by seven parallel conductive helices 14 arranged on or in the surface of an insulating drum 12. Each helix 14 is connected to a respective one of seven concentric commutator segments 15 located at one end of the drum 12. By way of contact brushes (not numbered) these commutator elements 15 are coupled to an appropriate signal source via input conductors 16. The broken line in FIG. 1 represents a suitable recording medium 18 which is moved substantially tangential to the drum 12. Appropriate motive means not illustrated may accomplish this movement in addition to rotating the drum 12 suitably about its axis. This axis of rotation is stationary and substantially parallel to a linear ink source 20 which is shown in general detail. As the drum 12 rotates it may be appreciated that portions of the seven helical members 14 are successively passed under the linear ink source 20 so as to effectively scan the width of the recording media as the drum completes one revolution. Therefore, if all the helical members or electrodes 14 were supplied a steady state signal voltage, ink would be drawn from the linear ink source as the drum 12 is rotated and the medium 18 is moved resulting in the formation of a series of parallel lines. Each line would extend in a direction transverse to the length of the ink source 20 and substantially parallel to the direction of the movement of medium 18. Seven ink droplets closely spaced together would constitute each line and would generally appear as a single linear ink deposition.

In this description, those portions of the helical elements 14 which have applied thereto an intelligence signal will be referred to as active portions or elements in that they are capable in their most proximate position relative to the linear ink source to effect ink flow from the source 20 onto the recording medium 18.

FIG. 2 discloses another embodiment of a backing assembly which is referred to generally by reference numeral 22. It is made up of an insulating block 24 with conductive elements 26 positioned relative to at least one surface of the block 24. Each of the elements 26 are separated by a similar distance from adjacent elements and are connected by an input connector 30 to a suitable signal source.

The backing assembly of FIG. 2 is utilized in conjunction with a recording medium in a linear ink source such that the recording medium is aligned substantially perpendicular to the conductive elements 26. The recording medium therefore moving in a direction transverse or substantially perpendicular to the linear ink source will move in a direction parallel to the long dimension of the elements 26. In such a configuration the backing assembly 22 will allow a linear deposition of ink having a length coextensive with that portion of the linear ink source which is directly adjacent the conductors 26. By suitably pulsing selected ones of the five conductive elements 26 and permitting the recording medium to be continuously moved, alphanumeric information may be recorded in a matrix configuration, for example, 5 x 7. Assuming a printing or recording row of eighty characters, eighty such blocks as shown in FIG. 2 may be aligned side by side, each block representing one column space. Of course, the blocks could be integrated into a single unit. In this manner, as the recording medium is moved an entire row of eighty alphanumeric symbols may be recorded, utilizing conventional decoding and matrix circuits to provide properly timed pulses to the appropriate conductive elements 26. That portion of any of the conductive elements 26 which has a signal applied to it and is most proximate to the linear ink source would then constitute an active element or portion of element 26. Naturally, the material of which block 24, as well as drum 12, is composed should have a dielectric property sufficient to prevent arching or breakdown between adjacent conductive elements 26, or helical members 14 in the case of drum 12 of FIG. 1.

Having described in detail the two embodiments of the backing assembly according to the present invention, reference will now be made to FIGS. 3 through 8 which illustrate three configurations according to the present invention which may be taken by the linear ink source 20 previously referred to in connection with the description of FIG. 1. In the description of these configurations, reference will be made to certain dimensions and parameters of the structures. Such references are made only for purposes of this description and are not critical to the operation of these structures since such parameters are functions of the characteristics of the inks employed as well as the signal voltages utilized.

Figure 4:
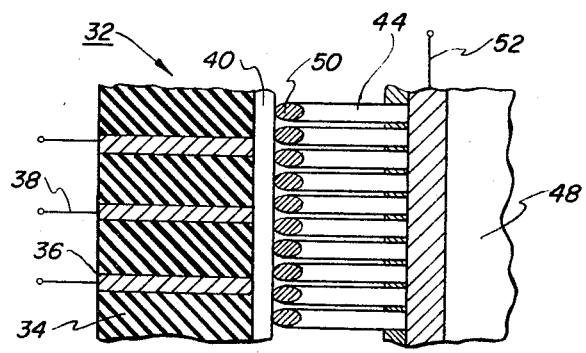
FIG. 4 is a sectional view of the linear ink source of FIG. 3 taken along section line 4—4.

FIG. 3 represents a side sectional view of one embodiment of the linear source and FIG. 4 is a sectional view taken along section line 4—4 in FIG. 3. This structure resembles very closely a brush-like configuration wherein the "bristles" are constituted by a series of closely spaced parallel wire elements 44 having a sheared tip 50 which is compatible for moving contact with the recording medium 40. This medium 40 moves across a surface of a backing assembly 32 generally composed of an insulator 34 having conductive elements 36 embedded therein or positioned thereon and connected by means of input conductors 38 to an appropriate signal source. The wires 44 may be 0.004 inch in diameter and spaced from each other on 0.005 inch centers. As shown in FIG. 4, an appropriate bias voltage is applied via conductor 52 to a conductive flange 48. This flange 48 extends parallel to the row of wires 44 to form an upper surface of the reservoir. As shown in FIG. 3, the ink contained in this reservoir 46 is maintained against the force of gravity by shim 42 which may also be conductive and the capillary action created by adjacent wires 44. The wires 44 may be secured through soldering or other suitable techniques to the reservoir side of shim 42. Wires 44 may extend from the edge of the shim 42 by a distance of approximately 0.06 inch and may be separated from flange 48 by approximately 0.02 inch. It may be noted that the extension of the wires past shim 42 may be such as to provide a natural resiliency so as to ensure contact with a recording surface which is not entirely smooth.

Figure 5:
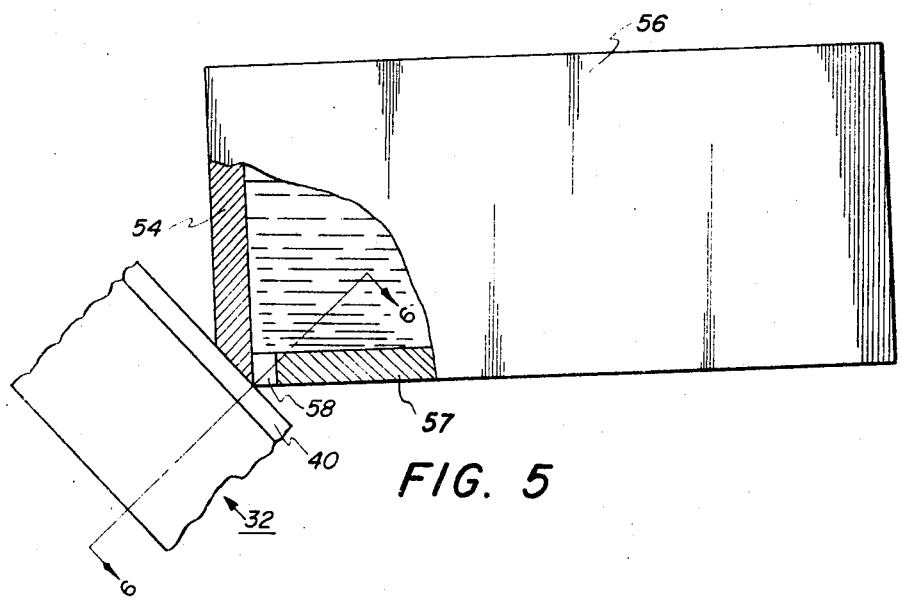
FIG. 5 represents another embodiment of the linear ink source of the present invention.
Figure 6:
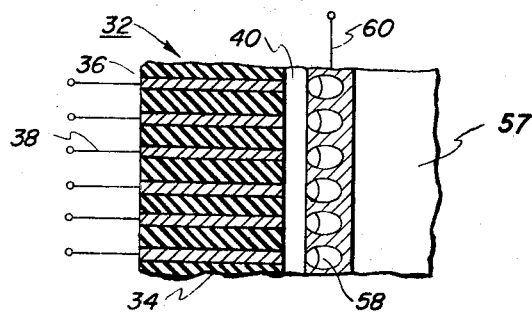
FIG. 6 represent a sectional view of the linear ink source of FIG. 5 taken along section line 6—6.

FIG. 5 represents a side view of a second embodiment of the linear ink recording source of the present invention with a portion broken away. FIG. 6 is a sectional view of FIG. 5 taken along section lines 6—6. Side walls 56 and 64 cooperate with bottom plate 57 to form an ink reservoir. Side wall 54 and the bottom plate 57 join to form an interior corner of substantially 90 degrees. A linear row of equally spaced uniform apertures 58 are formed in the bottom plate 57 immediately adjacent side wall 54. The bottom edge of side wall 54 is bevelled to accommodate sliding contact with a suitable recording medium 40 again shown on a partial view of a typical backing assembly as described hereinabove and referred to generally with reference numeral 32. The bias voltage applied to the ink is supplied by conductor 60 to the conductive ink reservoir. It may be realized that the capillary action of each of the orifices 58 prevent ink flow during the absence of any intelligence signal applied to input conductors 38 which are coupled to conductive elements 36. As an example, the orifices 58 may have a diameter of approximately 0.006 inch and may be spaced from adjacent orifices on 0.01 inch centers.

Figure 7:
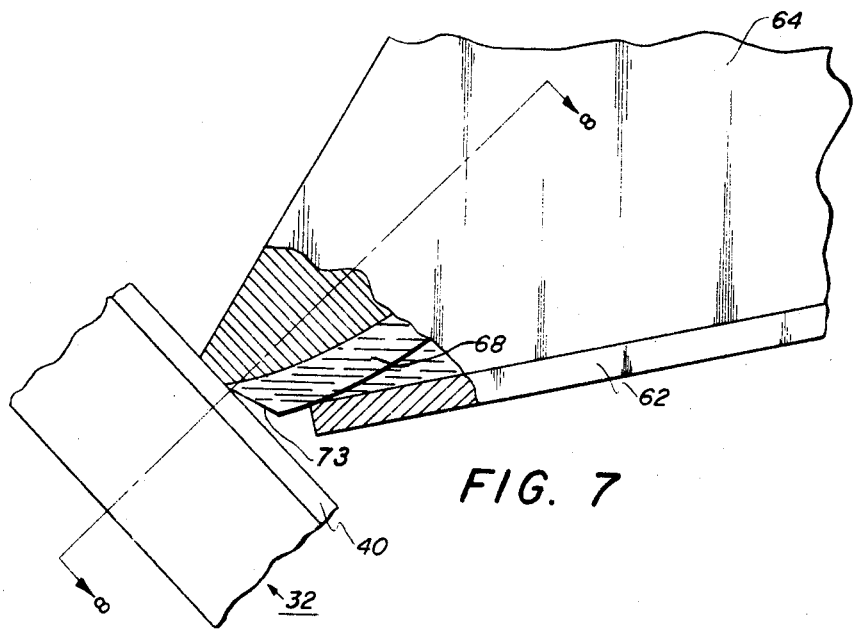
FIG. 7 represents another embodiment of the linear ink source of the present invention.
Figure 8:
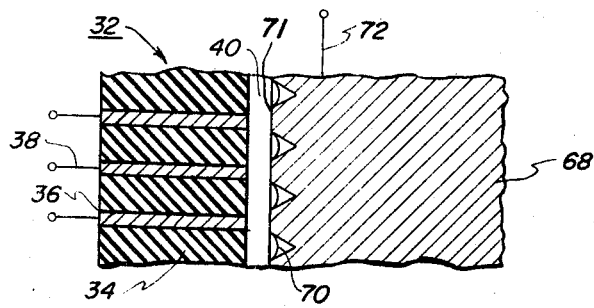
FIG. 8 represents a sectional view of the linear ink source of FIG. 7 taken along section line 8—8.

Referring to FIGS. 7 and 8 which represent a third embodiment of the linear ink source of the present invention, there is shown a partially broken away side view in FIG. 7 and a sectional view of this figure is shown in FIG. 8. The linear ink source represented by FIG. 7 may be composed of a partial conductive cylinder 68 having the curved portion uniformly threaded so as to form grooves 70 separated by lands 71. A side wall 64 and a bottom plate 62 cooperate with the threaded surface to provide a suitable ink reservoir which supplied ink to the capillaries formed by the grooves 70. As shown in the FIG. 7, the end of the threaded portion is bevelled at 73 to permit the ink meniscus to form closely adjacent to the recording surface of medium 40. A suitable bias voltage may be applied to the conductive ink reservoir via input conductor 72 as shown in FIG. 8. Depending upon the quality of recording desired the threads may be 100 or greater in number per linear inch along the axis of the cylinder constituting member 68.

While the invention has been described with reference to a preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A liquid ink recording apparatus for placing elemental ink depositions on a recording medium;
   (a) means for moving a recording medium through a recording zone, said recording zone extending in the direction transverse to the direction of movement of said recording medium and to an extent substantially coextensive with one dimension of said recording medium;
   (b) a reservoir adapted to contain a quantity of liquid ink;
   (c) linear ink source means operatively coupled to said reservoir to receive ink therefrom and in contact with said recording medium for maintaining a substantially linear locus of ink menisci at a predetermined proximate distance from said recording medium on one side thereof and substantially coextensive with said recording zone.
   (d) means for electrically biasing said linear ink source means at a predetermined potential; and,
   (e) backing means on the other side of said recording medium in said recording zone for presenting at least one of a possible plurality of active ink attracting elements opposite said linear ink source means.

2. A liquid ink recording apparatus as defined in claim 1 wherein said backing means includes:
   (a) an insulating support member extending coextensively with said recording zone;
   (b) a plurality of equally spaced and electrically isolated conductive electrodes carried by said support member and adapted to be selectively coupled to energizing signals, said plurality of electrodes substantially occupying the entire recording zone.

3. A liquid ink recording apparatus as defined in claim 1 wherein said backing means includes:
   (a) a cylindrical insulating member adapted to rotate about an axis parallel to said recording zone; and,
   (b) at least one conductive helical electrode carried by said cylindrical insulating member and adapted to receive sequential energizing signals.

4. A liquid ink recording apparatus as defined in any one of claims 1, 2 or 3 wherein said linear ink source means includes an electrically conductive cylindrical surface bearing equally spaced alternating grooves and lands arranged in a thread-like manner, said grooves adapted to hold ink and being terminated at a line parallel to said recording zone and proximate said recording medium thereat.

5. A liquid ink recording apparatus as defined in any one of claims 1, 2 or 3 wherein said linear ink source means includes:
   (a) a plurality of equally spaced apart conductive wires, said wires lying in a common plane and extending between said recording medium and said reservoir; and,
   (b) retaining means associated with said reservoir and extending substantially parallel to said plurality of wires for retaining ink in the space between said retaining means and said wires.

6. A liquid ink recording apparatus as defined in any one of claims 1, 2 or 3 wherein said linear ink source means includes a conductive member having at least two sides extending coextensively with said recording zone forming an angle, said two sides adapted to permit a flow of ink to said angle, said angle having uniformly spaced apart perforations therein adapted to form an ink meniscus thereat.

References Cited
UNITED STATES PATENTS

| | | | |
|---|---|---|---|
| 2,143,376 | 1/1939 | Hansell | 346—49 |
| 3,052,213 | 9/1962 | Schaffert | 118—637 |
| 3,279,367 | 10/1966 | Brown | 101—150 |
| 3,289,211 | 11/1966 | Klausons et al. | 346—140 |
| 3,341,859 | 9/1967 | Adams | 346—140 |
| 3,375,528 | 3/1968 | Klausons et al. | 346—140 |

JOSEPH W. HARTARY, Primary Examiner